United States Patent [19]
Radke

[11] 3,773,352
[45] Nov. 20, 1973

[54] MULTIPLE IGNITION SYSTEM FOR AIR CUSHION GAS SUPPLY

[76] Inventor: Donald G. Radke, 307 Birch Hill Drive, Rochester, Mich. 48063

[22] Filed: Mar. 30, 1972

[21] Appl. No.: 239,547

[52] U.S. Cl........... 280/150 AB, 102/40, 102/70.2 R
[51] Int. Cl............................................. B60r 21/08
[58] Field of Search.............. 280/150 AB; 180/103; 102/70.2 R

[56] References Cited
UNITED STATES PATENTS
3,532,358  10/1970  Selwa et al. ................... 280/150 AB
3,674,059  7/1972  Stephenson............................. 141/4
3,606,377  9/1971  Martin.......................... 280/150 AB
3,643,971  2/1972  Kusknick..................... 280/150 AB Primary Examiner—Kenneth H. Betts
Assistant Examiner—John P. Silverstrim
Attorney—Jonathan Plaut

[57] ABSTRACT

A multiple ignition system for air cushion gas supply of generated gas from pyrotechnic source to compensate for ambient temperature changes.

13 Claims, 4 Drawing Figures

MULTIPLE IGNITION SYSTEM FOR AIR CUSHION GAS SUPPLY

This invention relates to temperature control in a pyrotechnic device for supplying inflating gas to inflatable bag assembly under varying environmental temperature conditions.

BACKGROUND OF THE INVENTION

It has been proposed in the past to provide gas source means for inflatable bag mounted on the steering column or within the steering rim of an automobile, as well as at other positions within the vehicle. Such gas source means has been (a) a stored gas chamber or cylinder, or (b) a stored gas chamber in combination with pyrotechnic (gas generating) means, or (c) purely pyrotechnic (gas generating) means. The provision of stored gas in combination with pyrotechnic means or purely pyrotechnic means is desirable since such a system is of less weight when compared to just using a stored gas source, does not necessitate as large a stored gas source, if any, and takes up much less space; space being at a premium for the gas source mounted on the steering column or within the steering rim, especially.

Furthermore, where a pyrotechnic (gas generating) system is utilized, it is especially important that the system fire at not too high a temperature, so that burning or scorching of the bag or the transfer of too much heat to the atmosphere surrounding the bag does not occur. Because air cushion systems must operate in temperature environments ranging from about −40°F. to about 200°F., there is a special need for an inflating system involving a highly efficient method of inflation utilizing a pyrotechnic source which operates properly at widely varied atmospheric temperatures, without causing operational compromise, especially as to the temperature problems noted above. It is also desirable that the system be of such design so as not to present an off center balancing problem to the steering wheel mechanism, if in that position.

Although the invention will be described hereinafter with relation to the steering wheel position and a pure pyrotechnic source, it is understood that it is illustrative of other vehicle positions and a hybrid (gas cylinder in combination with pyrotechnic) as well.

BRIEF DESCRIPTION OF INVENTION

Applicant's invention is related to the provision of a multiplicity of ignition devices for the pyrotechnic balanced on the center line of the steering shaft in the illustrative embodiment, each with its own squib ignitor. In the event that the ambient temperature rises above a predetermined limit as a series of limits, a predetermined number of ignitors do not fire, resulting in a cooler burn.

DETAILED DESCRIPTION OF THE INVENTION

Figure 1:
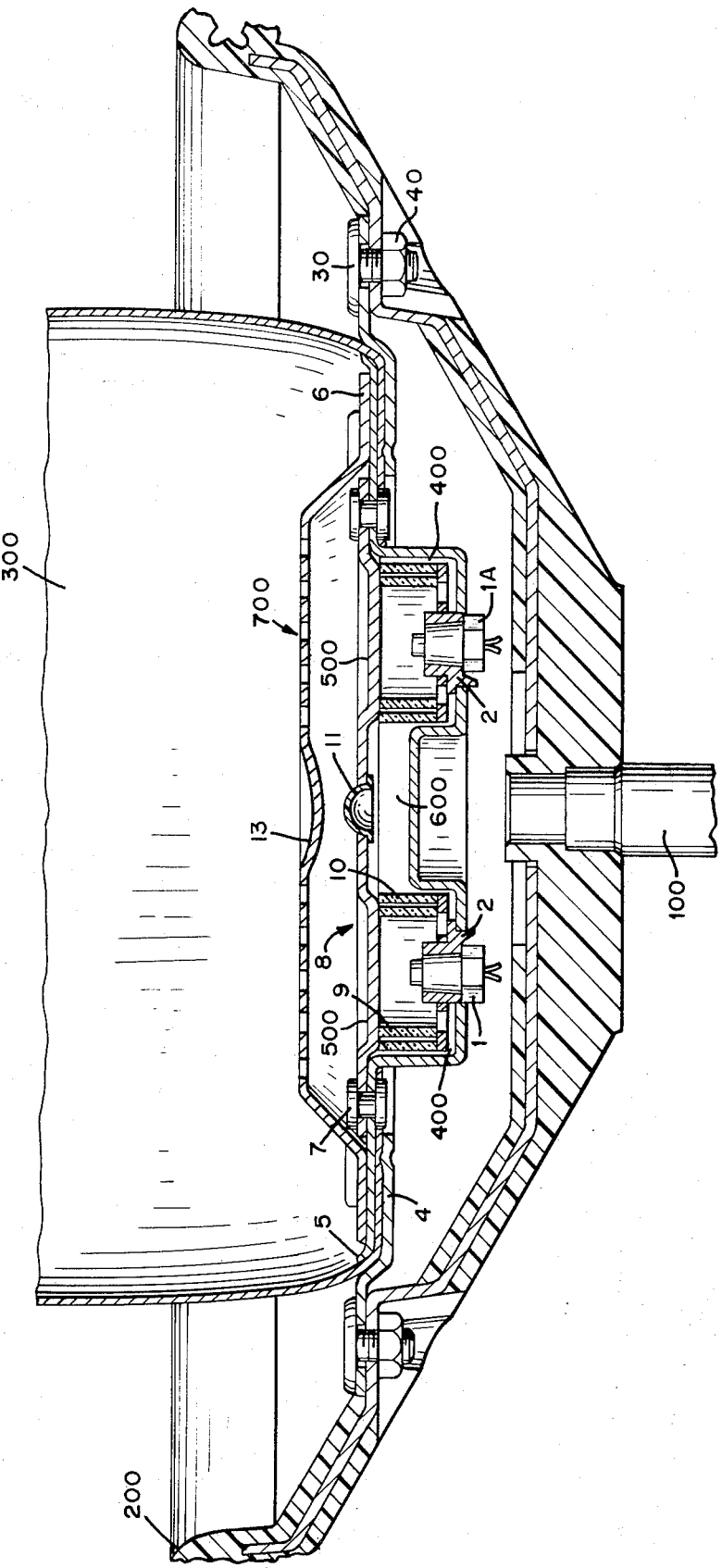
FIG. 1 of the drawings shows cut away view of one illustrative embodiment of the invention.

In the drawing, see FIG. 1, there is shown in illustrative embodiment a steering shaft 100 with a steering rim 200 mounted thereon. Mounted to the struts of connection between the rim and the shaft is a gas generating assembly; the mounting being, for example, by use of bolts 30 and nuts 40 attaching bag retaining plate 4 to said strut. Mounted to said plate 4 is inner manifold housing plate 5, as by rivets 7. The bag 300 to be inflated is located between the plate 5 and 4 and held thereby.

Located within the plate 5, in each of the recessed areas 400, are pyrotechnic (gas producing) assemblies. Two such recessed areas are shown in FIG. 1, but more could be provided for, and they are advantageously located in a symetric arrangement about the center line of shaft 100 for balance. The pyrotechnic assembly found within each of the recessed areas 400 is composed, in one embodiment, of a powder charge of double ring configuration 9 and 10 and composed of PVC combined with oxidizer (potassium perchlorate and potassium nitrate), is actuated by ignitors 1 and 1A (such as a squib) mounted with a plug 2. The ignitor extends through an orifice in the recess 400 and is connected to the sensing device 52 (see FIG. 2) of any desired design, or other means energizing the ignitor to set off the powder charge. Preferably, each ignitor or squib has a quick and hot burning compound, such as a starch compound, associated therewith, so as to be highly and rapidly ignitable to high temperature to create rapid ignition of the pyrotechnic. In the illustrative embodiment of FIG. 2, the ignitors are connected to the sensor through switches 51 and 61, to be described in more detail hereinafter.

The pyrotechnic system in the recess is capped off by a cover 8, which advantageously has ribs 500 for holding the charge in place in the recess and giving added strength.

Outer manifold cover 6 in the embodiment of FIG. 1 forms with cover 8 a manifold 700 which is apertured as shown for release of the generated gas to the surrounding air bag or bag system 300. Generated gas enters the manifold from the recesses 400 through the rupture plug 11, made of nylon, for example, after passing through interconnecting passageway 600 between the recessed areas 400, said passageway formed by housing plate 5 and cover 8. Deflector 13, in the form of a convex portion of cover 6 (viewing it in the direction of gas flow) spreads the gas laterally into the diffuser and then into the air bag, as described.

The total charge in the recesses is sufficient to provide enough gas to fill the bag in the required time and to the required volumn, and is divided so as to be located in the plurality of recesses 400. If an ignitor located in one of the recessed areas 400 does not function, the reaction from the other recessed area or areas will spread to that first mentioned recessed area through the passageway 600 to burn the unburned charge, but without the additional heat supplied by the unfuctioning ignitor and in a longer period of time for ignition of the total gas producing pyrotechnic, thus producing lower temperatures in the gas produced.

Figure 2:
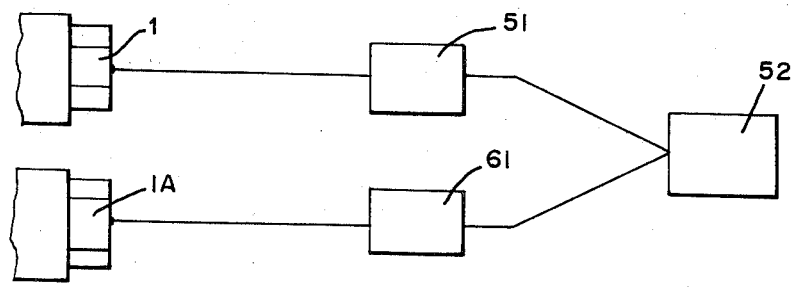
FIGS. 2 and 3 show two embodiments of circuitry in schematic form.

In the embodiment of FIG. 2 when the ambient temperature surrounding the gas supply unit rises above a predetermined limit, for example above about 135°F., a switch, for example, switch 51, opens so as to break contact between the sensor 52 and the ignition means 1. Thus when the temperature rises above the predetermined limit, the ignition means 1 is incapacitated, while the ignition means 1A remains in a firing attitude. Ignition means 1A may have a switch 61, or such switch may be dispensed with. This incapacitation of the ignition means 1 obviously lowers the temperature of the gas generated for inflation of the air cushion as previously discussed, but since the ambient temperature is elevated such loss of temperature is not critical.

When the switch 51, for example, is open as a result of the temperature exceeding the predetermined level and then the ambient temperature falls below the predetermined limit, say for example, about 120°F., the switch of this embodiment will close and squib or ignition device 1 will fire to produce the required heat and rapidity of flow of gas at such lower temperature.

Figure 3:
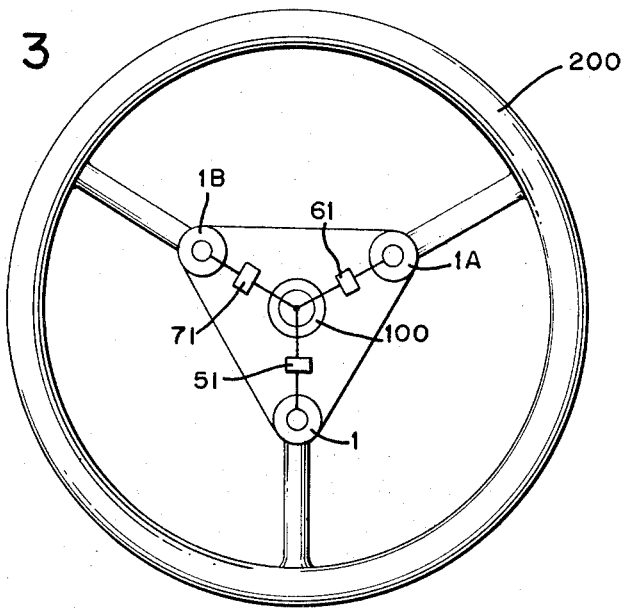

Of course, more than two ignition devices may be utilized as shown, for example, in FIG. 3, and the reduction in the number firing when ambient temperture is above the predetermined limit may be a fractional multiple of the number of ignition devices utilized.

It is considered advantageous as shown schematically in FIG. 3 to provide for at least three ignition devices in association with three areas of pyrotechnic source, with one switch 51 cutting an ignition device 1 out at elevated temperature, say about 135°F., as previously described, and one switch 71 cutting out its ignition device 1B at a low ambient temperature, say about 15°F. and adding in the ignition device 1B at say about 0°F., while the third ignition device 1A fires under all conditions. Again, the switch 61 may be included or dispensed with. Of course, instead of three ignition devices, a higher multiple may be utilized. Provision for added squib ignition at low ambient temperature and reduced squib ignition at high ambient temperatures allows for compensation for ambient temperature and thus reduction in the heat developed as the temperature of the atmosphere in which the system is working rises, leading to an elimination of scorching of the bag or an otherwise heated bag environment, as discussed.

The switch means may alternately be placed so as to be between the ignition devices and the source of power for that device, or in any other attitude desired to control firing of each ignition device.

Figure 4:
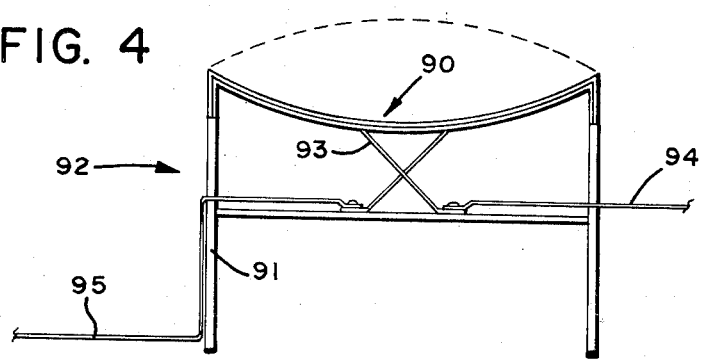
FIG. 4 shows one embodiment of a switch.

The switch may be of a number of known constructions, such as, in one embodiment, the bimetallic switch shown in FIG. 4. In the schematic embodiment shown, a bimetallic diaphragm 90 is mounted on a base 91 of a switch 92. Below the diaphragm 90 is contact element 93 when the diaphragm is in the concave shape shown. The contact element 93 completes the circuit, through circuiting 94 with 95 when the diaphragm is in the position shown. When the ambient temperature rises, say in one embodiment where the switch performs as switch 51 to above about 135°F., the diaphragm moves away from the contact element 93 to a convex position shown as dotted line in FIG. 4.

The switch described is of well known operation and not novel to applicant, but commercially available in one form from the Ademco Alarm Company of New Jersey. However, the switch described is extremely useful in the combination claimed because of its simplicity.

The sensor device used in this embodiment is of the type described in detail in pending United States application Ser. No. 117,560, filed Feb. 22, 1971.

In operation of the embodiment shown, firing of the ignitors 1 in the two recesses 400 shown at lower or moderate temperatures, causes burning and activation of the powder charge rings 9 and 10. If ignitors do not burn, because the ambient temperature is such to have inactivated the switch or switches, the associated powder ring will be activated by the burning from the other recess through passageway 600, to provide the required gas without the squib or ignitor which has been inactivated supplying unwanted heat, and with a slower time of complete burning, thus decreasing the heat.

Although the invention has been described with particularity with relation to the embodiment drawing, it is understood that it is intended that such embodiments are illustrative and that applicant intends to be limited only by the scope of the following claims.

I claim:

1. Method of igniting gas generating pyrotechnic on signal from crash sensing means for supply and filling of an air cushion device including more than one ignitor for said pyrotechnic, comprising upon ambient temperature conditions surrounding an ignitor rising above a certain predetermined limit deactivating said last mentioned ignitor and reactivating the last mentioned ignitor when said temperature falls below a predetermined level, distributing ignition impulse for each of said ignitors from said sensing means, and igniting pyrotechnic by the activated ignitors.

2. A process as claimed in claim 1 further including placing switch means in circuit between the sensing means and said ignitor which may be deactivated for accomplishing deactivation of said ignitor.

3. A method as set forth in claim 1 including at least three ignitors, including said ignitors previously recited, further comprising deactivating at least another ignitor on ambient temperature reaching above a predetermined limit of relatively lower temperature than said first recited limit, and reactivating said just recited ignitor at a predetermined temperature level below the relatively lower temperature level.

4. A process as set forth in claim 3, said first mentioned ignitor which may deactivate deactivating at a temperature level above about 135°F. and reactivating at a temperature level below about 120°F. and said another ignitor deactivating at a temperature level above about 15°F. and reactivating at a temperature level below about 0°F.

5. A process as set forth in claim 4, the ignitors being in the form of a squib.

6. A process as set forth in claim 1, said last mentioned ignitor deactivating at a temperature level above about 135°F. and reactivating at a temperature level below about 120°F.

7. Apparatus for igniting gas generating pyrotechnic on signal from crash sensing means for supply and filling of an air cushion comprising more than one ignitor for initiating burning of said pyrotechnic, electrical connection from each of said ignitors to said sensing means to initiate burning of said ignitor to burn pyrotechnic and inflate the cushion, switch means connected to at least one of said ignitors to deactivate said at least one ignitor when ambient temperature conditions surrounding said ignitor rise above a certain predetermined limit and to reactivate said at least one ignitor when said temperature falls below a predetermined limit.

8. Apparatus as claimed in claim 7, said switch means in circuit between the sensing means and the ignitor, said switch means open to deactivate the ignitor and closed to reactive the ignitor.

9. Apparatus as claimed in claim 8, said switch means being a bimetallic diaphragm switch sensitive to temperature.

10. Apparatus as claimed in claim 7, including at least three ignitors, including said ignitors previously recited, second switch means operatively associated with at least one of said other ignitors, said second switch to deactivate said other ignator on ambient temperature reaching above a predetermined limit of relatively lower temperature than said earlier recited limit and to reactivate each of said first and second ignitors at a predetermined temperature level below the temperature level at which each is deactivated.

11. Apparatus as set forth in claim 10, said at least one first mentioned switch means opening to deactivate the associated ignitor at a temperature level above about 135°F. and to reactivate closing at a temperature level of below about 120°F. and said at least one second switch means opening to deactivate the associated ignition at a temperature level above about 15°F. and closing to reactivate at a temperature level of below about 0°F.

12. Apparatus as set forth in claim 11, the ignitors being in the form of a squib.

13. Apparatus as set forth in claim 11, said ignitors balanced about the steering shaft assembly on which they are mounted.

* * * * *

UNITED STATES PATENT OFFICE
CERTIFICATE OF CORRECTION

Patent No. 3,773,352  Dated November 20- 1973

Inventor(s) Donald G. Radkf

It is certified that error appears in the above-identified patent and that said Letters Patent are hereby corrected as shown below:

Column 2, line 56, "unfuctioning" should read -- unfunctioning --. Column 6, line 3, "opening" should read -- open --.

Signed and sealed this 15th day of October 1974.

(SEAL)
Attest:

McCOY M. GIBSON JR.
Attesting Officer

C. MARSHALL DANN
Commissioner of Patents